US 8,272,265 B2

United States Patent
Bucher et al.

(10) Patent No.: US 8,272,265 B2
(45) Date of Patent: Sep. 25, 2012

(54) SYSTEM AND METHOD FOR ACTIVE DETECTION OF ASYMMETRY IN ROTATING STRUCTURES

(75) Inventors: Izhak Bucher, Haifa (IL); Ofer Shomer, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 707 days.

(21) Appl. No.: 11/988,757

(22) PCT Filed: Jul. 12, 2006

(86) PCT No.: PCT/IL2006/000811
§ 371 (c)(1),
(2), (4) Date: Jun. 25, 2009

(87) PCT Pub. No.: WO2007/007333
PCT Pub. Date: Jan. 18, 2007

(65) Prior Publication Data
US 2009/0293613 A1 Dec. 3, 2009

Related U.S. Application Data (60) Provisional application No. 60/698,022, filed on Jul. 12, 2005.

(51) Int. Cl.
*G01M 1/00* (2006.01)
(52) U.S. Cl. .......................................... 73/457; 73/462
(58) Field of Classification Search ............ 73/462, 73/460, 476, 1.14; 700/279
See application file for complete search history.

(56) References Cited

U.S. PATENT DOCUMENTS

| | | | | |
|---|---|---|---|---|
| 3,036,467 A | * | 5/1962 | McWhorter | 73/459 |
| 3,805,625 A | * | 4/1974 | Schlitt | 74/5.34 |
| 4,191,055 A | * | 3/1980 | Orem et al. | 73/462 |
| 4,254,658 A | * | 3/1981 | Kogler et al. | 73/462 |
| 4,255,163 A | * | 3/1981 | Sonderegger et al. | 451/343 |
| 4,262,536 A | * | 4/1981 | Orem et al. | 73/462 |
| 4,489,608 A | * | 12/1984 | Borner | 73/487 |
| 4,972,712 A | * | 11/1990 | Monch | 73/462 |
| 4,974,450 A | * | 12/1990 | Rothamel | 73/462 |
| 5,060,513 A | * | 10/1991 | Rothamel | 73/460 |
| 5,138,882 A | | 8/1992 | Humber et al. | |
| 5,355,728 A | * | 10/1994 | Hartmann, Jr. | 73/460 |
| 5,469,040 A | * | 11/1995 | Rothamel | 318/785 |
| 5,471,874 A | * | 12/1995 | Rothamel et al. | 73/462 |
| 5,587,528 A | * | 12/1996 | Rothamel et al. | 73/462 |
| 5,773,719 A | * | 6/1998 | Ferrari et al. | 73/487 |
| 5,831,152 A | * | 11/1998 | Rothamel | 73/66 |

(Continued)

OTHER PUBLICATIONS

International Search Report for Application No. PCT/IL/06/00811 Date of Jul. 3, 2008.

(Continued)

*Primary Examiner* — Peter Macchiarolo
*Assistant Examiner* — Samir M Shah
(74) *Attorney, Agent, or Firm* — Pearl Cohen Zedek Latzer, LLP (57) ABSTRACT

System and method for active detection of asymmetry in a rotating structure, the method comprises: imparting harmonic mechanical excitation on the rotating structure that is asynchronous to the speed of rotation of the structure; obtaining a response from the excited rotating body; and analyzing the response to determine a presence of modulation of the imparted harmonic mechanical excitation, that causes vibration at a frequency that is a combination of both the harmonic mechanical excitation and the modulation speed of rotation.

12 Claims, 3 Drawing Sheets

U.S. PATENT DOCUMENTS

| | | | |
|---|---|---|---|
| 5,959,204 A * | 9/1999 | Rothamel et al. | 73/462 |
| 6,430,992 B1 * | 8/2002 | Goebel | 73/66 |
| 6,708,563 B2 * | 3/2004 | Rothamel et al. | 73/460 |
| 6,752,016 B2 * | 6/2004 | Rothamel | 73/462 |
| 6,779,400 B1 | 8/2004 | Thelen et al. | |
| 6,809,449 B2 * | 10/2004 | Shinozaki | 310/90.5 |
| 6,826,959 B2 | 12/2004 | Min | |
| 6,840,104 B2 * | 1/2005 | Tamura et al. | 73/462 |
| 6,871,543 B2 * | 3/2005 | Rothamel | 73/462 |
| 6,872,543 B1 | 3/2005 | Sipponen et al. | |
| 7,055,379 B2 * | 6/2006 | Rothamel | 73/146 |
| 7,377,164 B2 * | 5/2008 | Rothamel et al. | 73/462 |
| 8,171,790 B2 * | 5/2012 | Sotgiu | 73/462 |
| 2002/0026829 A1 * | 3/2002 | Corghi | 73/487 |
| 2003/0101813 A1 * | 6/2003 | Rothamel et al. | 73/487 |
| 2003/0167840 A1 * | 9/2003 | Rothamel | 73/460 |
| 2005/0241393 A1 * | 11/2005 | Rothamel et al. | 73/462 |
| 2005/0247140 A1 * | 11/2005 | Abe et al. | 73/862.332 |

OTHER PUBLICATIONS

Bucher and Seibold: "A two-stages approach for enhanced diagnosis of rotating machines", IFFT conference on rotor dynamics, Darmstadt, Germany, pp. 338-349, Sep. 1998.

* cited by examiner

SYSTEM AND METHOD FOR ACTIVE DETECTION OF ASYMMETRY IN ROTATING STRUCTURES

CROSS-REFERENCE TO RELATED APPLICATIONS

This application is a National Phase Application of PCT International Application No. PCT/IL 2006/000811, International Filing Date Jul. 12, 2006, which claims priority of United States Provisional Patent Application No. 60/698,022, filed Jul. 12, 2005 all of which are incorporated herein by reference in their entirety.

FIELD OF THE INVENTION

The present invention relates to rotating structures. More particularly the present invention relates to method and system for detection of asymmetry in rotating structure.

BACKGROUND OF THE INVENTION

Mass and stiffness asymmetry in rotating machinery is often the manifestation of developing imperfections or faults. Any asymmetry in a rotating part adds a periodic term to the coefficients of the equations of motion with a magnitude proportional to the level of asymmetry and frequency of twice the rotation speed. There are several factors affecting the response at the speed of rotation and its multiples, therefore asymmetry has a negligibly small effect on the response magnitude (vibration). At these frequencies, asymmetry is very difficult to detect from the naturally arising response at an early stage. In theory, many faults do produce special features in the response in the form of additional harmonics or modulation, but in practice, due to the small magnitude of these signal components compared with the unbalance and normal dynamic response, faults are only detected when they are severe.

Asymmetry of a rotating system may arise from design specifications, fulfilling certain engineering requirements (e.g. wind turbines and impellers), or could be the result of developing faults such as shaft crack, case rubbing or turbine blade failure. In the latter, a dedicated diagnostic procedure of the rotating structure is required to monitor the machine, as an aid to schedule maintenance shut-downs, only when necessary. Mathematically, asymmetric rotating systems are characterized by periodic (usually harmonic) coefficients which may appear in the mass, damping or stiffness matrices. These periodic terms, can cause a parametric resonance or give rise to self excited vibrations.

Analytical and numerical tools for investigating time varying systems include the Lyapunov-Floquet transformation whereby a transition matrix transforms any Linear Time Periodic (LTP) equation of motion to a linear time invariant (LTI) differential equation.

In some rotating linear time variant systems, the Floquet-Lyapunov transformation may take the form of a coordinate system's transformation which results in constant coefficient matrices. The transformation matrix is obtained by defining two coordinate systems, inertial and rotating (body fixed).

Most of the publications related to rotordynamics focus on critical speeds prediction balancing procedures and stability analysis.

External excitation devices (e.g. magnetic bearings) open new possibilities for active detection of faults. The main source of excitation (misalignment and unbalance) in rotating machines appears at the multiples of the speed of rotation. It is often the case that a measurement of the normal response cannot be separated from the effect of a developing fault since minute defects are buried under larger signal components appearing at the same frequencies. Active diagnostics, on the other hand, is capable of injecting a dedicated interrogation force at non-synchronous excitation frequencies and with the help of appropriate models of the rotating system, a unique signal frequency that is the result of a specific defect may be created. With this model-based diagnostics, trending is no longer necessary and superior detectability of certain faults can be achieved. The appearance of tiny additional spectral lines in the presence of cracks was observed by Bucher and Seibold ("A two-stage approach for enhanced diagnosis of rotating machines", IFToM Conference on Rotor Dynamics, Darmstadt, Germany, pp 338-349, September 1998), in which both a model based and a signal based detection approach was proposed.

The present invention seeks to exploit the advantages of active diagnostics for the detection of asymmetry in the rotating part, by utilizing an external excitation device (e.g. Active Magnetic Bearing (AMB)) as a non-synchronous force exciter. The steady state response, expressed in inertial coordinates is shown to incorporate side-bands. While the carrier frequency is largely related to the symmetric part of the system, the magnitude of side-band frequency lines is associated with the level of asymmetry in the system. The concept and implications of non-synchronous excitation on the measured response are discussed hereinafter, with reference to several models, for the more simplified of which, analytical steady-state solutions are obtained. The rigid model is used to reveal the inherent ability to actively detect asymmetry. Flexible shaft models, in which the shaft's mass and gyroscopic effects are neglected, are then derived and solved to prove the advantages of the non-synchronous excitation over the synchronous excitation scheme. Detecting rotating asymmetry in the presence of anisotropic stator is demonstrated through an approximated solution using Hill's infinite determinant.

We further investigate the gyroscopic effect on the asymmetry detection. Using the Campbell diagram and the frequency response at different rotation speeds, a working point (rotation and excitation frequencies) is chosen, such that the modulated response indicative to the asymmetry would resonate. Further, a more realistic model in which finite element formulation is used and the shaft's mass is taken into account. The detection of asymmetry by means of non-synchronous excitation is demonstrated in the presence of a combined synchronous and asynchronous excitation sources.

BRIEF DESCRIPTION OF THE INVENTION

There is thus provided, in accordance with some preferred embodiments of the present invention, a system for active detection of asymmetry in a rotating structure, the system comprising:

at least one actuator for introducing mechanical force that imparts harmonic mechanical excitation on the rotating structure that is asynchronous to the speed of rotation of the structure;

at least one of a plurality of sensors for sensing a response from the excited rotating body in the form of vibrations of the rotating structure; and a signal processing unit for receiving the response and for analyzing the response to determine a presence of modulation of the imparted harmonic mechanical excitation, that causes vibration at a frequency that is a combination of both the harmonic mechanical excitation and the modulating speed of rotation.

Furthermore, in accordance with some preferred embodiments of the present invention, said at least one of a plurality of sensors comprises one or more proximity sensors.

Furthermore, in accordance with some preferred embodiments of the present invention, said at least one actuator comprises computer controlled active magnetic bearing.

Furthermore, in accordance with some preferred embodiments of the present invention, said at least one actuator is incorporated in a motor that serves for rotating the rotating structure.

Furthermore, in accordance with some preferred embodiments of the present invention, there is provided a method for active detection of asymmetry in a rotating structure, the method comprising:

imparting harmonic mechanical excitation on the rotating structure that is asynchronous to the speed of rotation of the structure;

obtaining a response from the excited rotating body; and analyzing the response to determine a presence of modulation of the imparted harmonic mechanical excitation, that causes vibration at a frequency that is a combination of both the harmonic mechanical excitation and the modulating speed of rotation.

Furthermore, in accordance with some preferred embodiments of the present invention, the frequency of the harmonic mechanical excitation is selected so that either $\omega+2\Omega$ or $\omega-2\Omega$, or $\omega+n2\Omega$, n being a positive or negative integer, where $\Omega$ is the instantaneous speed of rotation of the rotating structure and $\omega$ is the frequency of the harmonic mechanical excitation, is about the natural frequency of the rotating structure.

Furthermore, in accordance with some preferred embodiments of the present invention, the step of imparting the harmonic mechanical excitation is achieved using at least one actuator for introducing mechanical force on the rotating structure.

Furthermore, in accordance with some preferred embodiments of the present invention, said at least one actuator is incorporated in a motor that serves for rotating the rotating structure.

Furthermore, in accordance with some preferred embodiments of the present invention, said actuator comprises computer controlled active magnetic bearing.

Furthermore, in accordance with some preferred embodiments of the present invention, the step of obtaining the response is achieved using at least one of a plurality of sensors.

Furthermore, in accordance with some preferred embodiments of the present invention, said at least one of a plurality of sensors comprises one or more proximity sensors.

Furthermore, in accordance with some preferred embodiments of the present invention, the step of analyzing the response comprises using a signal processing unit for receiving the response and for analyzing the response.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

A main aspect of the present invention is the provision of a method and system for detecting in-situ small asymmetry (or asymmetries) in a rotating body. By "in-situ" is meant detection of asymmetry during normal operation of the rotating body, without having to stop its normal operation or without having to dismantle it for separate examination. By "asymmetry is meant any irregularity or imperfection in the distribution of mass and in the distribution of stiffness in said body.

The present invention suggests introducing a harmonic mechanical excitation that is asynchronous to the speed of rotation of said body. The presence of asymmetry in the body brings about modulation of the introduced harmonic mechanical excitation, that causes vibration at a frequency that is a combination of both (the harmonic excitation and the modulating speed of rotation).

$$\dot{\phi} \approx \frac{Q_e \Omega}{J_d \omega} \cos\omega t - \frac{Q_e}{J_d} \frac{\Omega}{2\omega} \frac{\Delta J}{J_m} (\cos(\omega+2\Omega)t + \cos(\omega-2\Omega)t) + O(\Delta J^2)$$

Where $\phi$ is the angular vibration response, $\Delta J$ is the deviation of the polar moment of inertia from its mean value, whereas $J_m$ is the mean value of the polar moment of inertia $Q_e$ is the amplitude of the asynchronous force, $J_d$ is approximately $J_m$ and t is time. $\Omega$ is the instantaneous speed of rotation, and $\omega$ is the frequency of the externally introduced excitation.

The frequency of the externally introduced harmonic excitation is selected such that the combined modulated frequency yields maximal response levels, causing the small asymmetry to have a maximal effect on the response at a distinct frequency.

The present invention does not seek to drive the entire system at resonance frequencies as this may cause substantial damage, but rather causes parametric excitation. In other words large whirling amplitudes are not desired and hence avoided, while at the same time small asynchronous oscillations of sufficient magnitudes are generated.

Figure 1:
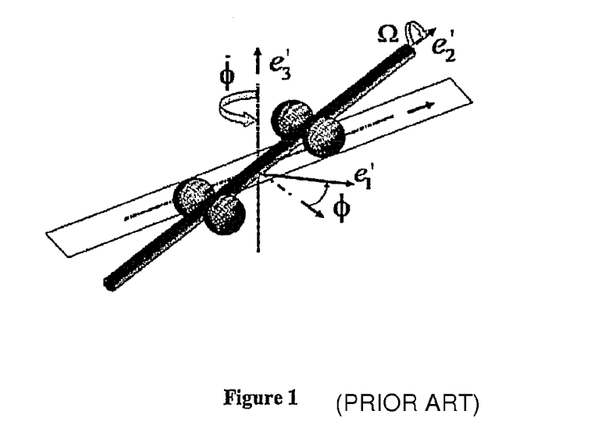
FIG. 1 illustrates a rigid asymmetric rotor.

Consider a rigid rotating shaft having a diagonal, constant, tensor of inertia, $I_O$ in the $e_1'e_2'e_3'$ C.S:

$$I_O = \text{diag}(J_d J_p J_d)$$

which is free to precess on a frictionless plane around $e_3'$, as shown in FIG. 1. The shaft is subject to a non-synchronous torque around $e_3'$.

Four identical point-masses (imperfections) m, are displaced from the original centre of shaft (the origin o of the $e_1'e_2'e_3'$ coordinate system (C.S.)), in a symmetric distribution, creating two unequal diametrical moments of inertia $J_x \neq J_z$, yet keeping the centre of mass unchanged so the shaft remains statically and dynamically balanced. The reason for examining a situation with four identical point masses arranged symmetrically about the rotating shaft is meant to emphasize the difference between this case and normal unbalanced situation. The latter is quite common and is manifested by means of a vibration at the frequency of rotation. This fact makes asymmetry difficult to distinguish from normal unbalance situation.

The locations of the 4 masses are:

$$r_1 = \rho e_1' + l e_2', \; r_2 = -\rho e_1' + l e_2', \; r_3 = \rho e_1' - l e_2', \; r_4 = -\rho e_1' - l e_2'$$

Consequently, due to constant rotation speed $\Omega e_2'$, the tensor of inertia has time-periodic terms. Newton's second law can be used to express the angular momentum of the shaft in $e_1' e_2' e_3'$, as:

$$T_G = \frac{d}{dt} h_G = \dot{h}_G + \omega \times h_G$$

Where $h_G$ is the angular momentum around the centre of mass (which coincide with the C.S. origin), and $\omega = \dot{\phi} e_3'$ is the angular velocity of $e_1' e_2' e_3'$ with respect to an inertial frame. By defining an external moment as $$\frac{d}{dt} Q(t) = \overline{Q}_e \cdot e_3' = -Q_e \sin(\omega t),$$

and neglecting friction, the precession can be expressed as:

$$\dot{\phi} = \frac{\Omega/\omega Q_e \cos(\omega t)}{\frac{J_x + J_z}{2} + \frac{J_x - J_z}{2} \cos(2\Omega t)}$$

Where, $$J_m = \frac{J_x + J_z}{2} = J_d + 4ml^2 + 2m\rho^2, \; \Delta J = \frac{J_x - J_z}{2} = 2m\rho^2.$$

Assuming that the mass imperfections are small, i.e. $J_d = 4ml^2 + 2m\rho^2$, and defining the asymmetry ratio (ASR)

$$\frac{\Delta J}{J_m} \cong \frac{2m\rho^2}{J_d},$$

the last equation simplifies into:

$$\dot{\phi} = \frac{\frac{\Omega}{J_d \omega} Q_e \cos(\omega t)}{1 + \frac{\Delta J}{J_m} \cos(2\Omega t)}$$

Since the asymmetry is small, the last equation may be expanded in a Taylor series:

$$\dot{\phi} \approx \frac{Q_e \Omega}{J_d \omega} \cos \omega t - \frac{Q_e}{J_d} \frac{\Omega}{2\omega} \frac{\Delta J}{J_m} (\cos(\omega + 2\Omega)t + \cos(\omega - 2\Omega)t) + O(\Delta J^2)$$

It can be noticed that the asymmetry is manifested by the addition of two modulated frequency components at $\omega \pm 2\Omega$ in the response, having amplitude proportional to the imperfection $\Delta J$. Indeed these terms become more significant at lower excitation frequencies, but the ASR is expected to be rather small and therefore the asymmetry may be difficult to detect without special means. It is clear from the last equation that the combination of rotation and an asynchronous external excitation isolates the asymmetry related term which can thus serve as a unique indicator for the level of non-uniformity in the angular mass distribution.

One of the measures one can take to amplify the asymmetry related signal components is to tune the excitation frequency until these terms become detectable. For this purpose a flexible shaft system must be investigated, and the natural amplification of elastic structures can be exploited.

When rotating asymmetry is present, two main cases can be considered: (i) Asymmetric mass distribution, namely different diametrical moments of inertia. (ii) Anisotropic shaft stiffness.

Figure 2A:
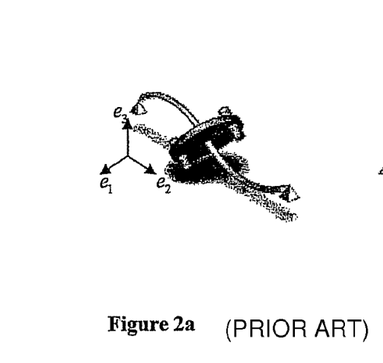
FIG. 2a illustrates a flexible massless shaft (deformed shape) having inertia asymmetry.
Figure 2B:
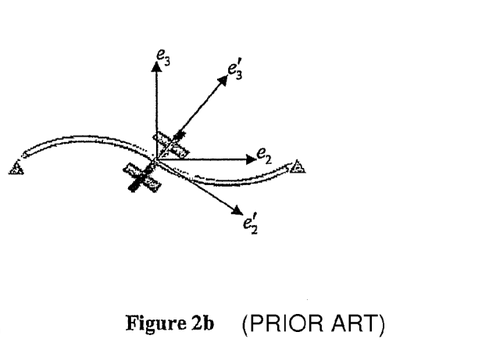
FIG. 2b illustrates the coordinate system which was used in the formulation (of the structure of FIG. 2a).

Consider a rigid disc with asymmetric diametrical moments of inertia (FIG. 2b) mounted on a massless, flexible shaft as depicted in FIG. 2a. The mathematical representation of the response of the system depicted in this figure to an external rotating excitation of magnitude $Q_e$ and frequency $\omega$ is given by:

$$\begin{pmatrix} \theta_x \\ \theta_z \end{pmatrix} \cong \frac{-Q_e}{J_m(\omega^2 - \omega_n^2)} \begin{pmatrix} \cos \omega t \\ \sin \omega t \end{pmatrix} + \quad (1)$$

$$\frac{\omega(2\Omega - \omega)Q_e}{4J_m(\omega^2 - \omega_n^2)\left(\Omega - \frac{\omega + \omega_n}{2}\right)\left(\Omega - \frac{\omega - \omega_n}{2}\right)} \left(\frac{\Delta J}{J_m}\right) \begin{pmatrix} \cos(\omega - 2\Omega)t \\ \sin(\omega - 2\Omega)t \end{pmatrix}$$

with $\Delta J = \frac{J_z - J_x}{2}, \; J_m = \frac{J_z + J_x}{2}, \; \omega_n^2 = \frac{\tilde{k}}{J_m}$ While only one frequency appears in rotating coordinate system (C.S.), the inertial C.S. steady state response is characterized by two frequencies. The coefficient of the modulated frequency $\omega - 2\Omega$ is proportional to the asymmetry ratio (ASR) which is $$\frac{\Delta J}{J_m},$$

while the response at the frequency of excitation $\omega$ is independent of the system's asymmetry. With no asymmetry, i.e. when $\Delta J \equiv 0$, only the first term remains.

The value of last function becomes very large when the asynchronous excitation frequency is either $\omega = \pm \omega_n$ or $\omega = 2\Omega \pm \omega_n$. In the latter case, the large response is attributed to a parametric excitation that appears only when the system contains the asymmetry related, time-varying coefficients. Other notable values are received for $\omega + n2\Omega$, n being a positive or negative integer.

A more suitable selection of the external excitation frequency would make the response at the modulated frequency $\omega-2\Omega$ a sensitive function of the ASR. An externally, asynchronous excitation can thus be tuned to detect small levels of mass asymmetry if $\omega-2\Omega$ is chosen close to one of the, speed-dependent, natural frequencies $-\omega_n$.

Figure 3A:
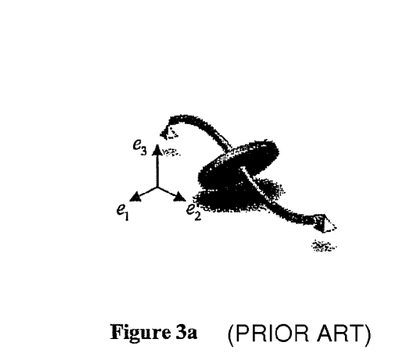
FIG. 3a illustrates a symmetric disc on an anisotropic shaft (deformed shape).
Figure 3B:
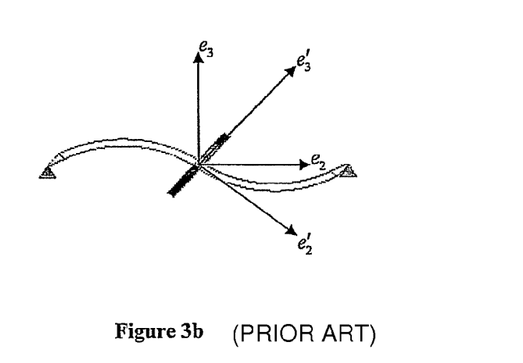
FIG. 3b illustrates the coordinate system which was used in the formulation (of the structure of FIG. 3a).

Following the discussion above, the question arises, whether anisotropic rotating stiffness, that approximates mathematically transverse cracks in the shaft, could be detected by the same approach, i.e. by means of non-synchronous excitation. FIG. 3a depicts a perfectly balanced, symmetric disc mounted on a massless, yet flexible, anisotropic shaft (the coordinate system is shown in FIG. 3b). As in the previous model, the $e_1'e_2'e_3'$, C.S. rotates with the shaft at a constant speed $\Omega$ around the $e_2'$ axis and the disc is free to precess in two orthogonal planes ($e_1'e_2'$ and $e_3'e_2'$). In the case of an asymmetric shaft the mathematical representation of the angular response to the externally introduced excitation is given by:

$$\begin{pmatrix} \theta_x \\ \theta_z \end{pmatrix} \approx \frac{Q_e \omega_n^2}{\tilde{k}_m(\omega_n^2 - \omega^2)} \begin{pmatrix} \cos\omega t \\ \sin\omega t \end{pmatrix} + \qquad (2)$$

$$\frac{Q_e \omega_n^4 \frac{\Delta \tilde{k}}{\tilde{k}_m}}{4\tilde{k}_m(\omega^2 - \omega_n^2)\left(\Omega - \frac{\omega + \omega_n}{2}\right)\left(\Omega - \frac{\omega - \omega_n}{2}\right)} \begin{pmatrix} \cos(\omega - 2\Omega)t \\ \sin(\omega - 2\Omega)t \end{pmatrix}$$

where $\tilde{k}_m = \frac{\tilde{k}_z + \tilde{k}_x}{2}$ and $\Delta \tilde{k} = \frac{\tilde{k}_z - \tilde{k}_x}{2}$ are the mean and deviatory stiffness respectively, and $$\omega_n^2 = \frac{\tilde{k}_m}{J_d}$$

is the averaged, squared natural frequency.

The anisotropy creates a unique frequency component at $\omega-2\Omega$ in the presence of asynchronous excitation. Since the modulated, non-synchronous response is directly proportional to the stiffness anisotropy, it can serve as a good indicator for this type of faults when a suitable excitation frequency is chosen.

It is often the case that the rotating asymmetric element rests on foundations with anisotropic stiffness. The model of asymmetric rotating mass mounted on stator stiffness (FIG. 4a, the coordinate system illustrated in FIG. 4b), is characterized by periodic coefficients in the EoM (Equation of Motion), both in inertial and rotating CS. Finding the transformation that would render the EoM time invariant is somewhat more difficult than what was shown above and the use of the Floquet Lyapunov Theory (FLT) and transformation is necessary. An alternative way to solve the LTV equations having periodically varying coefficients, the so called Hill's Infinite Determinant method (HID) is employed. In this approach, a suitable, closed form, approximation in a multi-frequency form is derived.

Figure 4A:
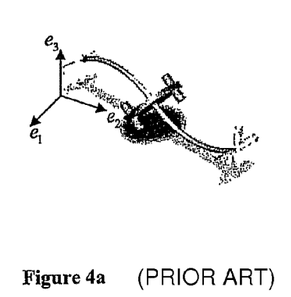
FIG. 4a illustrates an asymmetric rotor (deformed shape) resting on elastic, anisotropic supports.
Figure 4B:
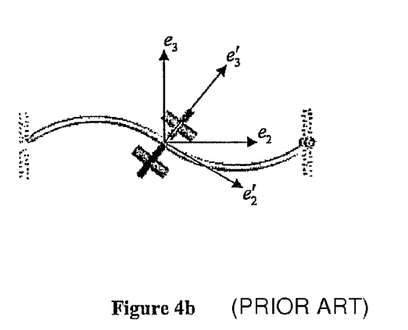
FIG. 4b illustrates the coordinate system which was used in the formulation (of the structure of FIG. 4a).

The response of a general rotating system resting on a general type of foundation is given by:

$$q(t) \approx q_0 e^{J\omega t} + \bar{q}_0 e^{-J\omega t} + q_1 e^{J(\omega+2\Omega)t} + \bar{q}_1 e^{-J(\omega+2\Omega)t} + q_{-1} e^{J(\omega-2\Omega)t} + \bar{q}_{-1} e^{-J(\omega-2\Omega)t}$$

where q(t) is a vector of N degrees of freedom.

The solution of this equation is expanded in a multi-variable Taylor series in both $\Delta J$ and $\Delta \bar{k}$. If the anisotropy can be considered small, then the series is truncated at $O(\Delta \bar{k}^2)$ and $O(\Delta J^2)$, resulting in:

$$q_{-1} \approx \frac{\omega(2\Omega - \omega)Q_e}{8J_m(\omega^2 - \omega_n^2)\left(\Omega - \frac{\omega + \omega_n}{2}\right)\left(\Omega - \frac{\omega - \omega_n}{2}\right)} \left(\frac{\Delta J}{J_m}\right)\begin{pmatrix} j \\ 1 \end{pmatrix}$$

Clearly, the expression for q−1 provides exactly the same result as in the case with asymmetric disc mounted on massless shaft (FIG. 1a). This equation demonstrates that the foundation asymmetry does not affect the ability to detect the asymmetry in the rotating part.

External excitation devices (e.g. Active Magnetic Bearing (AMB)) open new possibilities for active detection of faults.

In order to verify the proposed algorithm for detection of asymmetric rotors, according to the present invention, two test rigs were constructed: rigid rotor mounted on a soft table balancing machine, and flexible rotor rig (we refer to the latter experiment hereinafter).

The terms rigid and flexible are thought of in terms of geometry and speed of rotation of the system.

Two types of non-synchronous excitation devices were used. For the rigid rotor, a piezo-electric proof mass actuator, capable of applying non-rotating, harmonic excitations, was mounted on the balancing table. The flexible rotor experiment utilized an active magnetic bearing, able to exert spatially rotating forces at various frequencies.

Figure 5:
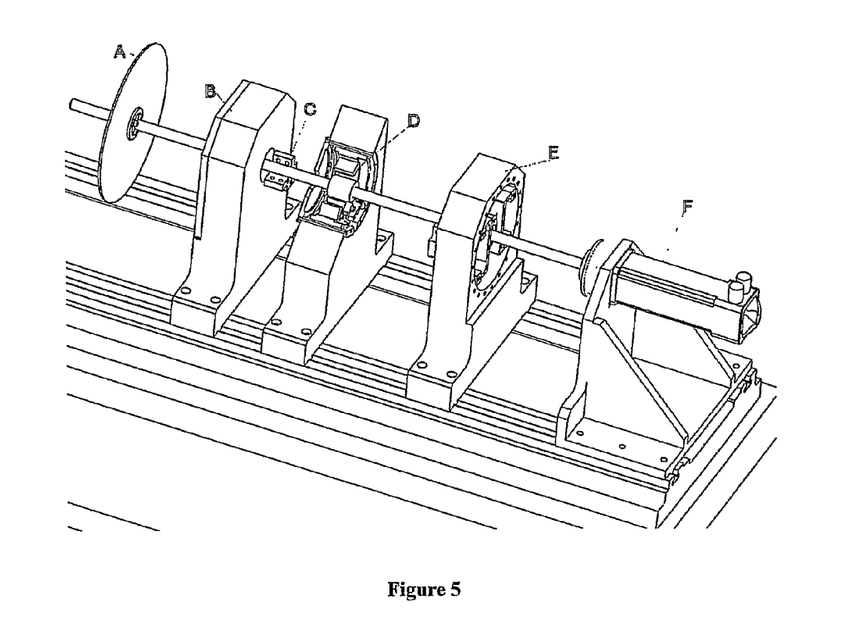
FIG. 5 illustrates a flexible rotor rig experimental set up, as was tested, according to the present invention.

The flexibility of a rotating system is considered with respect to its geometrical dimensions as well as the speed of rotation. The flexible-shaft based experimental system is depicted in FIG. 5, illustrating a flexible rotor rig set-up. A indicates a flexible disk containing small asymmetry, B indicates ball-bearing stand, C indicates sensors holder (for response measurements), D indicates Cut-out of the active magnetic bearing external force, E indicates bearing stand, and F indicates the electric motor.

In this experiment the shaft was 1 [m] long, its diameter 20 [mm], with one disc of diameter 300 [mm], and 3 [mm] thickness, mounted at its free end. Masses can be added to the disc to create an asymmetric inertia distribution. The shaft was connected to a servo motor through a bellows type constant velocity joint, and was supported by two self-aligning ball bearings. One, computer controlled, Active Magnetic Bearing (AMB) was located along the shaft and served as a non-synchronous exciter. In order to balance the system, two, Aluminum balancing planes of diameter 150 [mm] were added along the shaft. Being flexible, deformations of the shaft can be sensed directly; hence several proximity sensors were placed along the shaft both in horizontal and vertical position. The experimental system represents a realistic rotating structure where both the shaft and the supports are not perfect, and the rotation introduces gyroscopic effect. The actuator for imparting the asynchronous excitation on the rotating body can be incorporated and integrated with the motor that rotates the body. The measurements indicated hereinabove were the measurements used in the experiment and in no way limit the scope of the present invention.

It was shown that the steady-state response due to a non-synchronous force in two perpendicular planes contains 2 frequencies of vibrations. While vibrations at the frequency of excitation ω are related to the mean moment of inertia (the symmetric part) of the system, the vibration at the modulated frequency 2Ω−ω is exclusively associated with the deviatory moment of inertia of the system ΔJ. While the former frequency appears in the total response regardless of the ASR, the latter materializes only when ΔJ≠0, thus serves as an indicator of the asymmetry in the system.

In a parametric study, the frequency of excitation—ω was varied for every shaft speed—Ω. Thus, for a given system with well known physical properties (moments of inertia, bending stiffness etc.) and a non-synchronous force of known amplitude, with predefined locations for the force excitation and measured response, the optimal sensitivity of the asymmetry related term in the response, (in the Ω−ω plane) was obtained.

Eddy current proximity sensors were used. Since measurements are of the deformed shaft, XL 3300 proximity sensors from Bently-Navada™ were employed.

Analogue signals from the sensors are measured by the HP-Agilent™ VXI measurement system. An additional, analogue, resolver-to-encoder signal is produce by the motor controller and used as a reference phase signal.

The dSPACE™ system is used to communicate with the motor controller and control the AMB.

Figure 6:
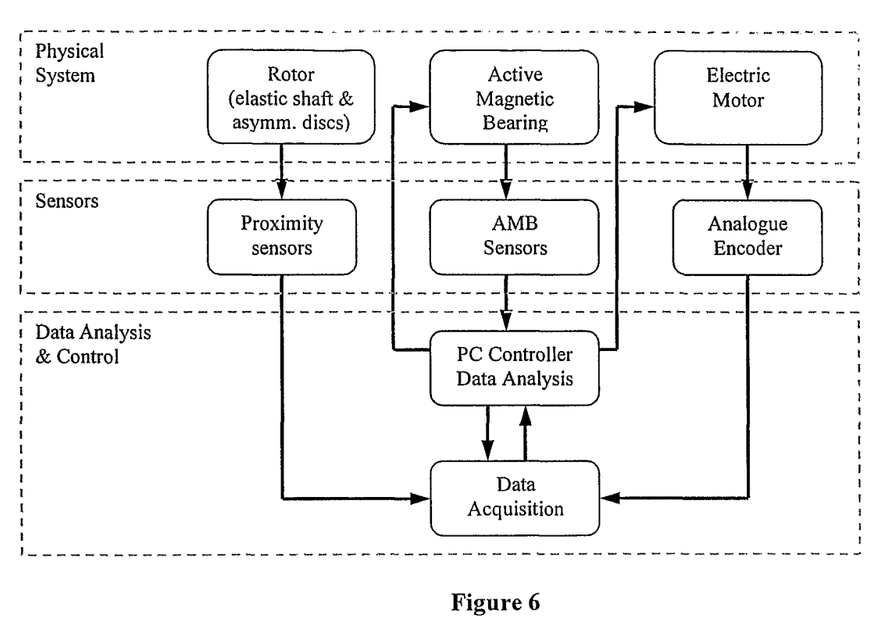
FIG. 6 illustrates a block diagram of the experimental set up, as was tested, according to the present invention.

A schematic view of the experiment setup is depicted in FIG. 6.

The non-synchronous frequency at which the AMB should excite the system should be chosen such that the modulated, indicative frequency component (ω±2Ω) would coincide with a natural frequency.

$$\omega = 2\pi f_{max} + 2\Omega = 2\pi \cdot 101.5 \text{ [Rad/sec]}$$

Two rotor types were examined: symmetric and asymmetric. The system was tested under three different modes of operation to assess its effect on the measured response:

No control—Active Magnetic bearing (AMB) is off.

With control—AMB is operating in closed-loop attempting to maintain zero displacement in both axes.

With Non-synchronous excitation—AMB is operating in close loop, trying to maintain a sinusoidal motion (for each axis) at 101.5 [Hz] (90° phase lag between the axes, guarantying constant amplitude, spatially rotating force is generated).

For each configuration (of rotor and control), four types of experiments were performed:

(i). Steady state response—at Ω=2175 [RPM]. With 1% asymmetry, with and without closed-loop control (ii) Steady state response—at Ω=2175 [RPM]. Without asymmetry with and without closed-loop control Measurements were taken at a sampling frequency of $f_s$=2560 [Hz].

Upon reaching steady state, measurements were sampled and amplitude estimation was carried out (by means of least squares), which considered the responses at the speed of excitation to, speed of rotation Ω, positive and negative modulated frequencies ω±2Ω and the first seven harmonics of the frequency of rotation nΩ, n=2÷8. The results of the amplitude estimation for the fundamental speeds appear in Table 1.

| Rotor type | Experiment type | Amplitude estimation (in μm) at speed | | | |
| --- | --- | --- | --- | --- | --- |
| | | Ω | ω | ω − 2Ω | ω + 2Ω |
| Symmetric rotor | w\o control | N\A | N\A | N\A | N\A |
| | w\control | 121 | 0.01 | 0.072 | 0.006 |
| | w\excitation | 12.7 | 8.67 | 0.284 | 0.81 |
| Asymmetric rotor | w\o control | 26.25 | 0.011 | 0.002 | 0.004 |
| | w\control | 20.35 | 0.006 | 0.053 | 0.013 |
| | w\excitation | 137 | 8.96 | 14.16 | 13.3 |

Figure 7:
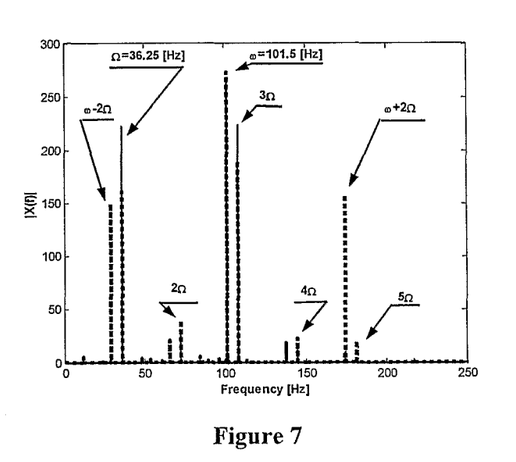
FIG. 7 illustrates a plot of the response measured on the experimental set-up with respect to frequency.

Table 1 reveals that the modulated signals are two orders of magnitude higher in the asymmetric rotor in comparison to the symmetric rotor thus serving as a good indicator to the asymmetry. While differences are also visible in the amplitudes at the speed of rotation Ω between the two cases, they are related to the effectiveness of the balancing procedure performed on each rotor and not directly to the amount of asymmetry. In addition, the amplitudes of the asymmetric rotor at the speed of rotation and speed of excitation are higher in the case of no control than in the case of zero reference control, which demonstrates the added value of the AMB as a damping element in the system. Analysis of the steady state response in the frequency domain was carried out by means of FFT. The differences in the spectrum of vibration in the presence of non-synchronous excitation are visible in FIG. 7, where the modulated frequencies ω±2Ω exhibit the biggest change in magnitude between the symmetric and asymmetric configurations, regardless of the level of unbalance in the system. Indeed, the fundamental speed of rotation and its harmonics also change between the configurations but this change may be related to the effectiveness of the balancing procedure. Moreover, in real applications, the change in these frequencies may not be exclusively associated with asymmetry change as other, unpredicted, phenomena may affect the same spectral lines.

The suggested detection scheme is applicable for rigid and flexible rotors. An AMB was incorporated into a flexible rotor test rig and applied non-synchronous excitation forces. A frequency response carried out on the rotating rig helped determine the optimal excitation frequency such that the expected sidebands would be excited in or near resonance.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A system for in-situ active detection of asymmetry in a rotating structure that rotates about an axis of rotation, the system comprising:
   at least one actuator for introducing mechanical force that imparts harmonic mechanical excitation on the rotating structure that is asynchronous to the speed of rotation of the rotating structure and perpendicular to the axis of rotation;
   at least one of a plurality of sensors for sensing a response from the excited rotating structure in the form of vibrations of the rotating structure;
   a signal processing unit for receiving the response and for analyzing the response to determine a presence of modulation of the imparted harmonic mechanical excitation, that causes vibration at a frequency that is a combination of both the harmonic mechanical excitation and the modulating speed of rotation.

2. The system as claimed in claim 1, wherein said at least one of a plurality of sensors comprises one or more proximity sensors.

3. The system as claimed in claim 1, wherein said at least one actuator comprises computer controlled active magnetic bearing.

4. The system as claimed in claim 1, wherein said at least one actuator is incorporated in a motor that serves for rotating the rotating structure.

5. A method for in-situ active detection of asymmetry in a rotating structure that rotates about an axis of rotation, the method comprising:
   imparting harmonic mechanical excitation on the rotating structure that is asynchronous to the speed of rotation of the rotating structure and perpendicular to the axis of rotation;
   obtaining a response from the excited rotating structure; and
   analyzing the response to determine a presence of modulation of the imparted harmonic mechanical excitation, that causes vibration at a frequency that is a combination of both the harmonic mechanical excitation and the modulating speed of rotation.

6. The method as claimed in claim 5, wherein the frequency of the harmonic mechanical excitation is selected so that either $\omega+2\Omega$ or $\omega-2\Omega$, or $\omega+n2\Omega$, n being a positive or negative integer, where $\Omega$ is the instantaneous speed of rotation of the rotating structure and $\omega$ is the frequency of the harmonic mechanical excitation, is about the natural frequency of the rotating structure.

7. The method as claimed in claim 5, wherein the step of imparting the harmonic mechanical excitation is achieved using at least one actuator for introducing mechanical force on the rotating structure.

8. The method as claimed in claim 7, wherein said at least one actuator is incorporated in a motor that serves for rotating the rotating structure.

9. The method as claimed in claim 7, wherein said actuator comprises computer controlled active magnetic bearing.

10. The method as claimed in claim 5, wherein the step of obtaining the response is achieved using at least one of a plurality of sensors.

11. The method of claim 10, wherein said at least one of a plurality of sensors comprises one or more proximity sensors.

12. The method as claimed in claim 5, wherein the step of analyzing the response comprises using a signal processing unit for receiving the response and for analyzing the response.

* * * * *